Nov. 21, 1967 H. POPPINGER ET AL 3,354,375
THYRISTOR SYSTEM FOR CONTROLLING DIRECT CURRENT
Filed Dec. 3, 1964 4 Sheets-Sheet 1

United States Patent Office 3,354,375
Patented Nov. 21, 1967

3,354,375
THYRISTOR SYSTEM FOR CONTROLLING DIRECT CURRENT
Herbert Poppinger, Munich, Germany, Werner Volkmann, Erie, Pa., and Rainer Däubler, Kirchheim (Teck), Germany, assignors to Siemens-Schuckertwerke Aktiengesellschaft, Berlin-Siemensstadt, Germany, a corporation of Germany
Filed Dec. 3, 1964, Ser. No. 416,198
Claims priority, application Germany, Dec. 5, 1963, S 88,572
9 Claims. (Cl. 321—5)

ABSTRACT OF THE DISCLOSURE

A first rectifier has an input connected to a three phase alternating current supply and is free of reactive smoothing components so as to provide a first periodic direct voltage. A second rectifier has an input connected to the three phase alternating current supply and is free of reactive smoothing components. The second rectifier has a second periodic direct voltage which is at least temporarily zero and thereafter lower than the first voltage in a first portion of each switching period and is higher than the first voltage in the remaining portion of the period. The two rectifiers are connected through two thyristors to two load buses for applying thereto the two voltages. A firing control circuit is connected to the two thyristors for periodically firing them in sequence so as to energize the buses from the second rectifier during the second portion of the period.

Our invention relates to a system for controlling direct current supplied to a load and, in a more particular aspect, to a thyristor system operating on the on-off principle.

The control or regulation of the mean current supplied to a load is often effected by semiconductor controlled rectifiers, now being generically called "thyristors" regardless of the particular semiconductor material of which they are made and regardless of their particular design features. Thyristors operate as electronic latching switches which, once triggered into conductance, will continue to conduct until the applied voltage declines to a minimum value close to zero. In this respect, the performance of thyristors largely corresponds to that of thyratrons. For that reason the following also applies to the latter components.

A thyristor is fired by a pulse applied to a gate electrode if a voltage of suitable polarity is impressed between the main electrodes. The current then switched on is determined only by the feeder voltage and by the impedance of the load and can no longer be controlled by the thyristor which resumes its blocking ability only when the load current has declined below the so-called holding current value close to zero and, upon elapse of the so-called turn-off time, a feeder voltage is again applied to the thyristor in the forward direction.

The turn-off time is the length of time needed from the moment when the forward current passes below the holding value to the moment at which a forward feeder voltage can again be applied with the assurance that the gate of the thyristor has reliably regained control of the forward blocking ability. This minimum interval of time depends upon various conditions, such as the particular design of the thyristor and the time curve of the applied feeder voltage.

A thyristor can be operated as a latching switch only. If a continuous variation of a median load current is desired, this current can be periodically interrupted by the thyristor under control by a firing voltage which is applied to the gate electrode and determines the ratio of the switched-off intervals to the full duration of the feeder voltage cycle period. For smoothing the load current it is advisable to connect an inductive resistance (reactor) in series with the load and to also connect an inversely poled diode, called "free-wheeling diode" or "zero anode," parallel to the series connection of load and inductive resistance. The same effect can be obtained without the use of smoothing reactor or the like inductive component, if the load itself has a high inductive component, this being the case, for example, if the load is a magnet or the excitation winding of an electrical machine.

This principle is involved in the operation of the so-called direct-current chopper circuits in which the load is connected to a direct-voltage source through a thyristor, and a commutating capacitor is connected through another thyristor in parallel relation to the first-mentioned thyristor. The two thyristors are alternately ignited periodically so that the load current is determined by the ratio of the turn-on intervals of the respective thyristors.

A simple possibility of controlling the mean value of a direct current with the aid of thyristors is available if the current can be supplied by rectification from an alternating-voltage source. In such cases a rectifier bridge network fully or partially equipped with thyristors can be employed. Aside from requiring a number of thyristors, such a rectifier system has the disadvantage that the phase position of the firing pulses must be varied only within a limited range such as less than 120 electrical degrees. This requirement causes considerable difficulties if no sinusoidal voltage is available for feeding the rectifier network, as is the case if the system is connected through a rectifier to a synchronous generator which, when operating under full load, furnishes a nearly rectangular output voltage.

In cases where the load current to be controlled by thyristors is supplied from a continuous direct voltage, the systems known for such purposes require the use of commutating capacitors for temporarily reducing the feeder voltage to periodically zero to permit turnoff of the thyristors. Such commutating capacitors are comparatively large components as they must be capable of temporarily absorbing the load current.

It is an object of the invention to provide a more advantageous way of continuously controlling the mean value of direct current supplied to a load through thyristors.

Another object of the invention is to provide a direct-current control system of the on-off or discontinuous type operating with thyristors which does not require the provision of commutating capacitors and whose performance is not affected by the wave shape of the feeder voltage.

According to the invention, a thyristor system for controlling the mean value of a unidirectional load current by periodic switching of the thyristors, is equipped with two direct-current sources, one having a periodic voltage which is at least temporarily at the zero value and otherwise lower than the voltage of the other direct-current source during a first portion of each switching-cycle period and is higher than the voltage of the other source during the remaining, second portion of each period. The load to be energized, or the direct-current buses from which the load may be energized, are in connection with the two direct-current sources through two thyristors respectively, and the gate electrodes of these two thyristors are provided with firing control means for periodically firing the thyristors in sequence so as to energize the load buses during the second portion of each period from the one direct-current source then having the higher voltage.

In a system according to the invention, the thyristor connected between the load and the latter direct-current source (hereinafter referred to as the "second" source) is periodically turned off without the necessity of providing additional auxiliaries for the turnoff operation. This is due to the fact that the voltage of the second direct-current source is periodically at the zero value during part or all of the first portion of each cycle period.

In contrast thereto, the output voltage of the other direct-current source (hereinafter called the "first" source) may have a variety of time characteristics. For example, it may furnish an output voltage of a fixed constant value which tends to drive through the first thyristor between the first source and the load a current continuously above the holding current value of this first thyristor, so that the thyristor could not be turned off without additional auxiliary means. However, since the firing control circuits take care of always having the second thyristor turned on after the first thyristor is turned on, the second thyristor will each time commutate the load current away from the first thyristor which thereafter is stressed in the blocking direction due to the fact that, after the second thyristor is turned on, the voltage of the second direct-current source is higher than that of the first source.

Preferably used as direct-current sources are rectifiers which are connected to a three-phase alternating-current supply line and which do not contain smoothing means. Due to the absense of reactive impedances in the rectifiers, the direct voltages issuing therefrom are periodic. According to another feature of our invention, a particularly simple control system is achieved by using as the first direct-current source a three-phase bridge network of rectifier diodes in which one of the three diode legs between the three alternating-current phases and one of the two rectifier output terminals, for example the positive terminal, is omitted.

According to another feature of the invention, the second direct-current source is formed of two diode legs which are connected between only two phases of the alternating-current supply and one of the direct-current output terminals, the second direct-current terminal being in symmetrically conducting connection, preferably directly connected, with the third phase. If in the above-mentioned three-phase rectifier network, the diode leg between a first one alternating-current phase (R) and the positive output terminal of the rectifier network is omitted, it is preferable to connect the two diode legs of the second direct-current source between the respective two other phases (S, T) and the negative output terminal of the second source, and to connect the positive output terminal of the second source with the first phase (R).

According to still another feature of our invention, the number of components required for such a system can be further reduced by taking advantage of the fact that, if the first direct-current source is constituted by the above-described incomplete three-phase rectifier bridge network of five diode legs, the voltage occurring between one of the direct-current output terminals of this network and the one alternating-current phase which is connected through diodes with only one of the two output terminals, just exhibits a wave shape as desired of the voltage of the second direct-current source. Consequently, according to the feature of our invention here in point, one and the same five-legged bridge network is employed to serve as the first as well as the second direct-current source, thus doing away with the need for a second rectifier circuit.

There are essentially two different ways of connecting the thyristors between the load buses and the above-mentioned two sources or source voltages. One way is to connect the two thyristors serially between one of the load buses and the respective two direct-current sources or voltages. According to the second way of connecting the thyristors, only the second direct-current source or voltage is directly connected in series with one of the thyristors to one of the load buses, whereas the first direct-current source or voltage is connected with the same load bus through the first thyristor in series with the second thyristor.

The last-mentioned way of connection has the advantage that the firing control circuits for the two thyristors need furnish a firing pulse only every 360° electrical, the phase position of the firing pulse, relative to the voltage phase of the alternating-current supply, being variable between zero and 360° in dependence upon a control voltage. It is only necessary to block the supply of the firing pulses to the first thyristor as soon as these pulses are located in the second portion of each switching period.

This, however, involves relatively large power losses because the load current must pass through both transistors. Such power loss is avoided if the load is connected through the respective two transistors directly with the two direct-current sources. In this case, the firing control circuits must furnish a first pulse whose phase position depends upon the variable control voltage, and a second pulse which occurs each time at the beginning of the second portion of each period. The second pulse is supplied to the second thyristor when the variable-phase pulse occurs in the first portion of the cycle period. However, when the latter pulse occurs in the second portion of the period, it is to be applied to the second thyristor to take the place of the pulse of constant phase position.

The invention will be further described with reference to embodiments of direct-current control systems according to the invention illustrated by way of example in the accompanying drawings, in which.

Figure 1:
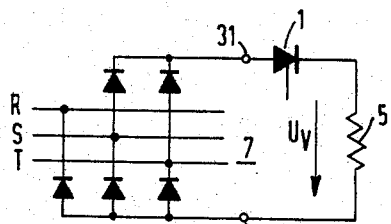
FIG. 1 shows schematically an example of a first direct-current source suitable for the purpose of the invention.
Figure 2:
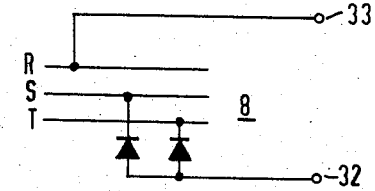
FIG. 2 shows an example of a second direct-current source suitable for the purpose of the invention in conjunction with a first source as shown in FIG. 1.
Figure 1A:
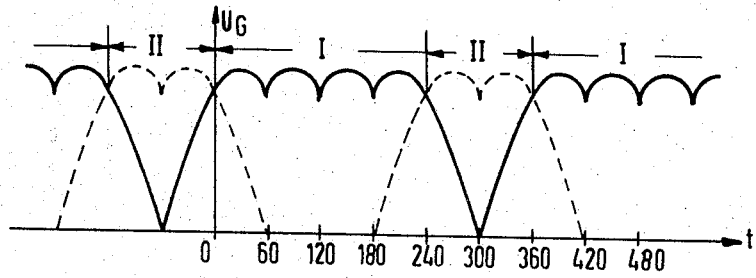
FIG. 1a is an explanatory graph relating to the voltage of the first source.
Figure 2A:
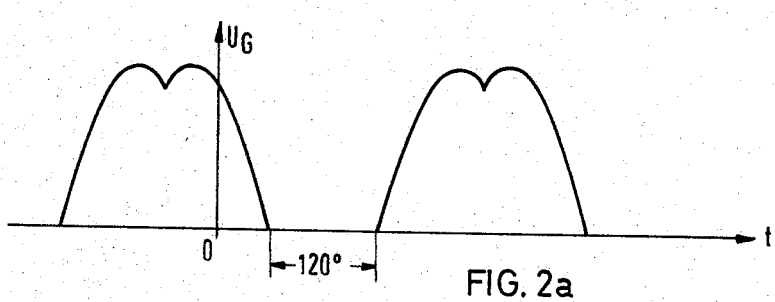
FIG. 2a is an explanatory graph relating to the voltage of the second source.

FIGS. 1 and 2, as well as the corresponding graphs FIGS. 1a and 2a, are essentially explanatory and serve to exemplify respectively a first direct-current source and a second direct-current source suitable for conjoint use in a thyristor control system according to the invention.

The first direct-current source according to FIG. 1 is constituted by an "incomplete" three-phase bridge network 7 of diodes which comprises only five instead of the conventional six diode legs. The bridge network is connected to the three-phase buses R, S and T of an alternating-current supply line. One of the direct-current output terminals 32 of the rectifier bridge is connected through respective three diodes with the phase buses R, S and T. The other output terminal 31 is connected through only two diodes with respective phases S and T. A load 5 is connected through a thyristor 1, such as a silicon controlled rectifier, between the two output terminals 31 and 32.

The wave shape of the rectified voltage $U_V$ impressed upon the load 5 when the thyristor 1 is turned on is represented by the full-line curve (FIG. 1a) in which the abscissa denotes time ($t$) in electrical degrees and the ordinate represents the amplitude $U_G$ of the rectified voltage. Due to the absence of smoothing reactance components in the rectifier network, the load voltage declines to the zero value in periodically recurring intervals of time.

By varying the moment at which the thyristor 1 is fired and thus turned on during each such voltage "half-wave" or cycle period, the median direct voltage impressed upon the load 5 can be varied in accordance with the conventional "delayed commutation" or "cut-in" method. However, it is difficult to reliably effect turnoff of the thyristor in the vicinity of the zero voltage, particularly if this voltage, after reaching the zero value, again increases at a very rapid rate. These difficulties can be somewhat reduced if additional circuit components having a threshold voltage value, for example diodes, are inserted into the load circuit. This has the effect of prolonging the time elapsing between the moment when the load current declines below the holding current and the moment when the thyristor is again impressed by feeder voltage in the forward direction. When employing such means, no additional components for effecting turnoff of the thyristor are required. On the other hand, it is not possible to utilize the maximum of direct voltage derivable from the three-phase supply line. The maximal load voltage rather is limited to ⅚ of the voltage obtainable from a complete, six-legged three-phase bridge network of rectifier diodes.

The second direct-current source exemplified in FIG. 2 essentially consists of a rectifier circuit 8 likewise connected to the phases R, S, T of a three-phase alternating current supply line, preferably identical with the one shown in FIG. 1. The direct-current output terminals of the rectifier shown in FIG. 2 are denoted by 32 and 33, it being understood that the terminal 32 may be identical with the terminal 32 in FIG. 1. The wave shape of the direct voltage furnished from such a rectifier is shown in FIG. 2a in which the abscissa denotes time and the ordinate denotes voltage amplitude in the same manner as in FIG. 1a. The direct voltage of the second source is also entered by broken lines in FIG. 1a.

The voltages from the first source and from the second source jointly cover a full angular range of 360° (electrical) and thus correspond to a full cycle period of a direct-current control system operating on the discontinuous or "on-off" principle.

As explained, a first source as exemplified by FIG. 1 and a second source as exemplified by FIG. 2 are to be combined in a thyristor control system according to the invention. A particularly simple way of doing this is embodied in the control system shown in FIG. 3. The two direct-current sources correspond to those shown in FIGS. 1 and 2, but they are combined to form a single bridge-type rectifier 3 with a single negative (first) output terminal 32 and two positive output terminals 31 and 33. The load 5 is connected between the terminals 31 and 32 of the first source through a thyristor 1, and is also connected between the terminals 32 and 33 of the second source through the thyristor 2. A free-wheeling diode 6 (also called "zero anode") is connected parallel to the load 5. Such an inversely poled diode is necessary in cases where the load 5 has an inductive component. This is the case, for example, when the load 5 is constituted by the field winding of a generator or alternator whose output voltage is to be controlled or regulated by the illustrated system. The free-wheeling diode then maintains a flow of current through the load 5 during the intervals of time in which the thyristors are turned off.

The gate or firing electrodes of the thyristors 1 and 2 are connected to the output terminals a and b respectively of a firing control unit 4 which issues to terminals a and b respective ignition pulses which are 360° spaced apart and whose phase position relative to the above-mentioned voltage cycle period depends upon the magnitude of a control voltage $U_{st}$ supplied to the control unit 4.

Figure 3:
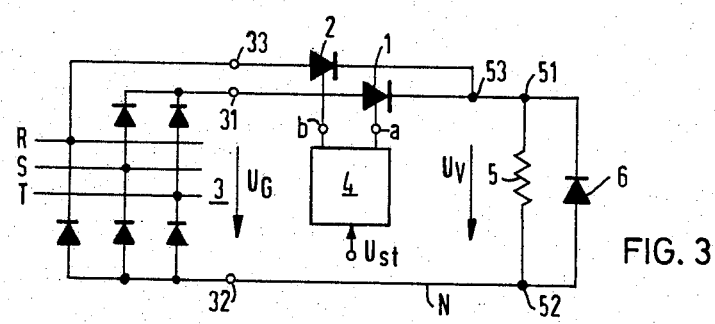
FIG. 3 is a schematic circuit diagram of a control system combining a first source and a second source of direct current.

In the system shown in FIG. 3, the load voltage can be controlled to vary between zero and the maximum amplitude obtainable from a three-phase rectifier bridge network. For example, as long as the phase angle of the ignition pulses, determined by the control voltage $U_{st}$, is within a first portion I of the cycle period, namely between 0° and 240° as shown in FIG. 1a, the ignition pulse from the control unit 4 is supplied through terminal a to the thyristor 1. In addition, the thyristor 2 receives from terminal b an ignition pulse every 360° at a time point closely following the phase-angle 240° (FIG. 1a). When the ignition pulse supplied to thyristor 1 is at 120°, the current commences to flow at the 120° moment from terminal 31 through thyristor 1 and load 5 to terminal 32. Shortly after the 240° moment, an ignition pulse is supplied to thyristor 2 so that from then on the current flows from terminal 33 through thyristor 2 and load 5 to terminal 32. Since now the voltage between terminals 33 and 32 is higher than the voltage between terminals 31 and 32, the thyristor 1 is electrically stressed in the blocking direction and thus is turned off. However, the load current continues to flow through the thyristor 2 up to the 420° moment. Thereafter the thyristor 2, whose feeder voltage now reaches zero, is likewise turned off and does not receive feeder voltage in the forward direction for an interval of time corresponding at least to 220°. This interval, in virtually all feeder frequencies occurring in electric power distribution systems (for example 50 or 60 c.p.s.), is considerably longer than the turnoff time of a thyristor.

On occasion, difficulties may be encountered on account of the free-wheeling diode 6 connected parallel to the load 5. This is because the voltage drop of this diode is effective in additive relation to the voltage of the rectifiers and, under certain operating conditions, may continue to drive through thyristor 2 a current above the holding value after the voltage between terminals 32 and 33 has declined to zero. To prevent this, a rectifier having a high threshold value may be interposed between terminal 32 and the alternating-current supply phase R, or an additional diode may be connected serially into the load circuit of the thyristor 2. Such an optionally applicable diode is shown at 32a in FIG. 6.

For example, if the load voltage is to be controlled down to a very low value so that the commutation delay (cut-in angle) is more than 240°, the firing pulse is supplied only to the thyristor 2, whereas the thyristor 1 remains blocked continuously as long as this particular control condition persists.

Figure 6:
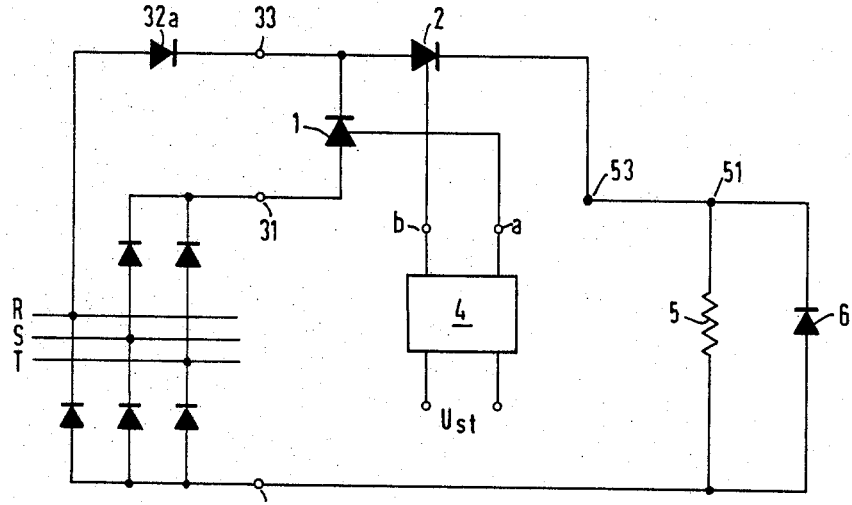
FIG. 6 is a schematic circuit diagram of a modified control system generally similar to that of FIG. 3.

It has been mentioned above that the requirements to be placed upon the firing control circuits are simplified by connecting the thyristor 1, not between terminals 31 and 53 (FIG. 3), but between the terminals 31 and 33, as is shown in the system according to FIG. 6 which otherwise corresponds to the one illustrated in FIG. 3. However, the diode 32a, not always required in a system as shown in FIG. 3, must be used in a system according to FIG. 6 where it is more essential to promote the turnoff performance of the thyristor 2.

In a system according to FIG. 6, the positive load bus (terminal 53) is connected with the output terminal 33 of the second direct-current source only through the series-interposed thyristor 2, whereas the same positive load bus is connected with the output terminal 31 of the first direct-current source through the series arrangement of both thyristors 2 and 1. In such a system, the firing control unit need furnish an ignition pulse only every 360°, this pulse having a phase position varies between 0° and 360° in dependence upon the control voltage $U_{st}$. The ignition pulse is supplied to both thristors 1 and 2 as long as the pulse occurs in the portion I of the cycle period. In this case, the current commutates at the 240° moment from thyristor 1 to thyristor 2, and the thyristor 2 is turned off at a later moment. However, when the phase position of the ignition pulse falls into the portion II of the cycle period, the ignition pulses are to be supplied only to the thyristor 2. The supply of the ignition pulses to the thyristor 1, therefore, is to be blocked as soon as the phase angle of the ignition pulses amounts to more than 240°.

Details of the aforementioned firing or trigger unit 4 do not form part of our invention, it being understood that a variety of suitable trigger circuits are known and available. For example, such trigger circuits are commonly known from the handbooks issued by SCR manufacturers (such as RCA). Reference may also be had to the trigger circuits illustrated and described in Electronics of June 29, 1964, p. 46; Sept. 21, 1964, p. 85; and Oct. 5, 1964, p. 70; also to U.S. Patent 3,040,270. Preferably applicable are trigger circuits of the type shown and described in the copending application of K. Samberger et al., Ser. No. 295,764, filed July 17, 1963, and assigned to the assignee of the present invention.

Figure 4:
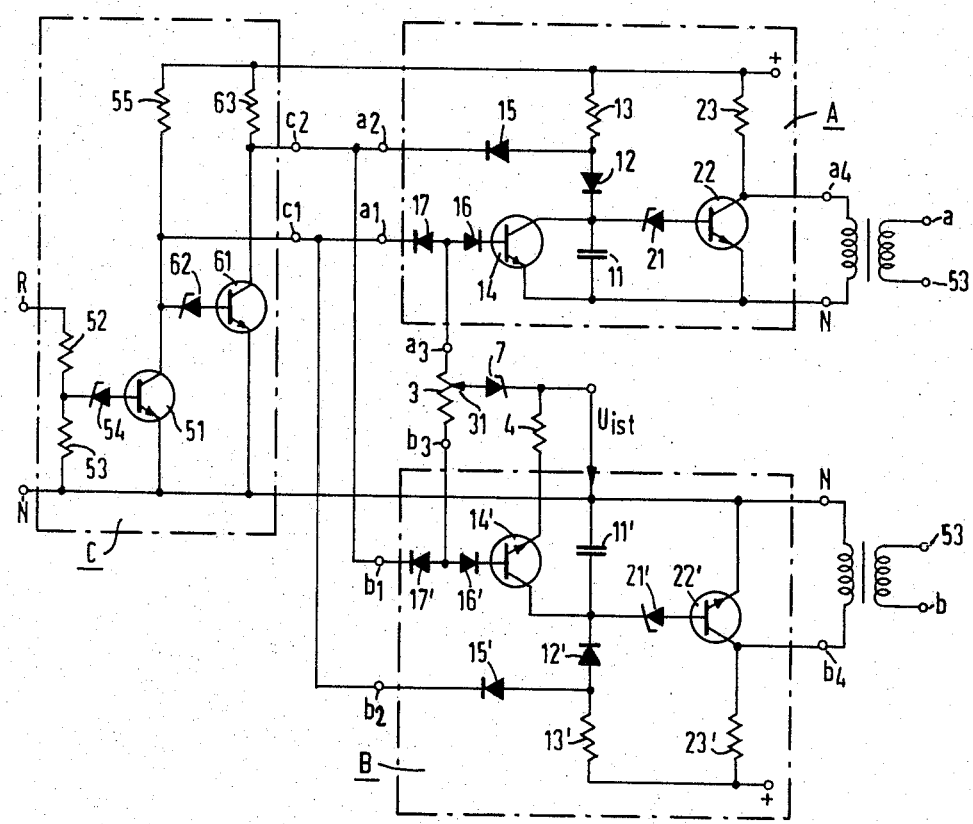
FIG. 4 is a circuit diagram which exemplifies firing control means applicable for a system as shown in FIG. 3.

For illustrative purposes, however, we have shown in FIG. 4 of the accompanying drawings, a firing control unit which is particularly well applicable for use in a system according to our invention, such as the one shown in FIG. 3. It should be understood, however, that the control unit according to FIG. 4 does not form part of our invention proper and that no claim is made herein with respect to details of this particular unit.

The control unit according to FIG. 4 comprises two identically designed trigger circuits A and B connected to a common control stage C.

Each trigger circuit A (B) comprises a capacitor 11 (11') energized by a substantially constant voltage through a decoupling diode 12 (12') and a resistor 13 (13'). The trigger path of a transistor 22 (22') is connected through a Zener diode 21 (21') in parallel relation to the capacitor 11 (11'). The collector electrode of the transistor is connected to an output terminal $a4$ ($b4$) and is also connected through a resistor 23 (23') to the positive pole (+) of a source of constant voltage whose negative pole is denoted by N. The transistor 22 (22') is turned on as soon as the voltage of the capacitor reaches a limit value determined by the Zener voltage of the diode 21 (21'). At this moment, a drop in voltage occurs at the terminal $a4$, and this change in voltage is utilized for providing an ignition signal. For this purpose, if necessary upon further amplification, the voltage change is applied through a transformer across the gate-electrode terminal $a$ and the positive terminal 53 (see FIG. 3) of the thyristor 1. Thereafter the capacitor remains at a voltage determined by the Zener diode until the end of the control cycle period.

It will be noted that the corresponding output terminal $b4$ of the second trigger circuit B (FIG. 4) is analogously connected through a transformer, if necessary upon amplification, across the terminals $b$ and 53 (see FIG. 3) for applying firing pulses to the second thyristor 2.

Also connected in parallel to the capacitor 11 (11') is the emitter-collector path of a transistor 14 (14') whose base electrode is connected through a decoupling diode 16 (16') to an input terminal $a3$ ($b3$). The terminal $a3$ ($b3$) is connected through another decoupling diode 17 (17') with an input terminal $a1$ ($b1$). The diode 17 (17') is so poled that the base of the transistor 14 (14') is connected through two series-opposed diodes with the input terminal $a1$ ($b1$).

The discharge rate of capacitor 11 depends upon the voltage occurring between the terminals $a3$ and N. The larger this voltage, the more rapid is the capacitor discharge. However, the transistor 14 cannot be turned on by the voltage at terminal $a3$ when the input terminal $a1$ is connected with terminal N. The control current is then bypassed through the diode 17, and the transistor 14 remains turned off.

The trigger circuits A, B are provided with respective further input terminals $a2$, $b2$ which are connected through respective diodes 15, 15' and respective charging resistors 13, 13' with the positive pole (+) of the voltage source. The diodes 15, 15' are so poled that the charging current flowing through resistor 13 is drawn from capacitor 11 and passes through the diode 15 when terminal $a2$ ($b2$) is connected with the terminal N. This always occurs when the positive potential is applied to the other terminal $a1$ ($b1$) and hence the transistor 14 is turned on. As a consequence, the discharge of the capacitor is determined only by the magnitude of the control voltage.

The control stage C is essentially a two-stage transistor amplifier. The transistor of the first stage is denoted by 51 and the transistor of the second stage by 61. The collector electrodes of these two transistors are connected through respective resistors 55 and 63 with the positive pole (+) of the direct-voltage source. The collector electrodes are further connected with respective output terminals $c1$ and $c2$. The base of transistor 61 is connected through a Zener diode 62 with the collector of the transistor 51 in the preceding amplifier stage. The base of transistor 51 is connected through a Zener diode 54 to a voltage divider consisting of resistors 52 and 53 which extends between the terminals R and N. As long as the voltage between terminals R and N is below a given limit value, the transistor 51 is turned off and the terminal $c1$ has a positive potential. The transistor 61 is then turned on so that the terminal $c2$ has the potential of the bus N. As explained below, the terminal R (FIG. 4) is preferably connected to the phase R of the alternating-current supply line (FIG. 3); hence the use of the same reference character for both.

However, when the voltage between R and N exceeds the above-mentioned limit value determined by the Zener diode 54, the transistor 51 is turned on and the transistor 61 turned off. Now, the positive potential is applied to the terminal $c2$, and terminal $c1$ is connected through the emitter-collector path of transistor 51 with the negative bus N. It will be recognized, therefore, that complementary signals will always occur at the respective terminals $c1$ and $c2$.

The input terminals $a1$ and $a2$ of the trigger circuit A and the corresponding input terminals $b1$ and $b2$ of the trigger circuit B are connected with the respective output terminals $c1$ and $c2$ of the control stage C. However, the terminals $b1$ and $b2$ are exchanged in polarity with respect to terminals $a1$ and $a2$. In other words, when terminal $a1$ of trigger circuit A is connected with terminal $c1$ of control stage C, then the terminal $b2$ of trigger circuit B is connected with the same terminal $c1$ of stage C, and both the terminal $b1$ of trigger circuit B and the terminal $a2$ of trigger circuit A are connected to the output terminal $c2$ of control stage C.

This has the consequence that the two trigger circuits A and B operate in alternating relation to each other. Assume, for example, that a positive signal is applied to terminal $c1$, while terminal $c2$ is connected with bus N. In this case, the control voltage applied to terminal $a3$ of trigger circuit A becomes effective, and the capacitor 11 is discharged through the transistor 14. This discharge is determined only by the magnitude of the control voltage because the capacitor, under the conditions explained above, cannot be charged simultaneously. The charging current, otherwise flowing through the resistor 13, is then bypassed to bus N through diode 15 and transistor 61.

This condition is maintained until the change in signals occurs at the output terminals of the control stage C. Only then is the discharge of capacitor 11, determined by the control voltage, terminated. Recharging of the capacitor, which is determined exclusively by the size of capacitor 11 and of resistor 13, then commences. During this charging interval, the control voltage has no effect upon the charging of the capacitor.

The inverse conditions are simultaneously encountered in trigger circuit B. Since its terminal $b1$ is connected with the output terminal c2 of the control stage C, the control voltage applied to the input terminal b3 cannot become effective. Consequently, the transistor 14' is turned off. Since, furthermore, the positive potential is applied to the input terminal b2 connected with the output terminal c1 of the control space C, the diode 15' is also blocked. As a result, the capacitor 11' is charged through diode 12' and resistor 13' until the capacitor voltage reaches the value required for the transistor 22' to be turned on and to thereby release a firing signal.

The charging of the capacitor thus commences always at the moment of change in signals at the output terminals c1 and c2 of control stage C. The time required until the voltage is reached at which the transistors 22, 22' are turned on, depends upon the extent to which the capacitor was previously discharged in the period prior to the change in output voltages of the control stage.

Figure 5:
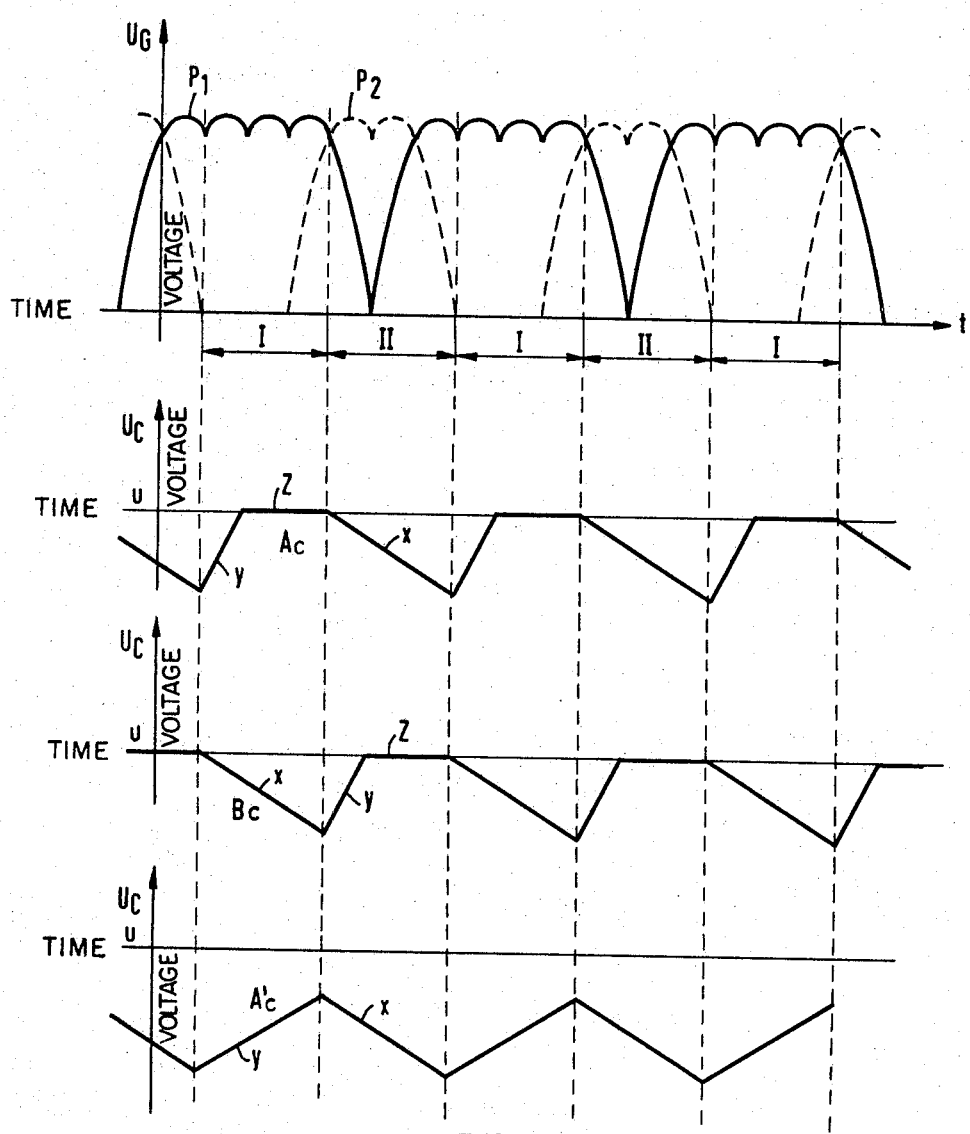
FIG. 5 is an explanatory graph relating to the operation of the firing control means shown in FIG. 4.

The above-described performance of the control unit is represented by the graphs shown in FIG. 5 in which the abscissas denote time ($t$) and the ordinates denote voltage amplitudes. The diagram in the top portion of FIG. 5 again represents the time curve of the first direct voltage at the positive terminal 31 (in FIG. 3) relative to the negative bus N (terminal 32), and also indicates by broken lines the time curve of the second direct voltage at the positive terminal 33.

As explained, the time position of the firing pulses is determined, as a rule, by a control voltage supplied to the control unit. The control unit supplies the pulses to the thyristor 1 as long as the control voltage remains below a given limit value. When the control voltage exceeds this limit, the ignition pulse is supplied to the thyristor 2. As also described, this differentiating performance is obtained by providing two trigger circuits A and B (FIG. 4) of which the circuit A is connected with the thyristor 1 and the circuit B with the thyristor 2. Each firing circuit can issue a firing pulse to the appertaining thyristor only in the proper portion of each full switching cycle, and each portion I in which firing may occur is followed by a "measuring" portion II which completes the cycle period.

In FIG. 5 the two portions I and II of each period are placed somewhat differently from those shown in FIG. 1a. The proper correlation of the time portions I and II to the periodic voltages issuing from the rectifier assembly 3 according to FIG. 3, is secured by the control stage C (FIG. 4) if the input terminal R (FIG. 4) is connected with the phase R (FIG. 3) of the alternating-current supply line shown in FIG. 3.

FIG. 5 further shows the time curves $A_c$ and $B_c$ of the voltage at the capacitors 11 and 11' respectively. The two voltage diagrams relate to a case in which the two trigger circuits A and B operate independently of each other and receive through the respective terminals $a3$ and $b3$ a control voltage of the same magnitude. This control voltage determines the inclination of the curve portions denoted by $x$ in FIG. 5. The higher the control voltage (for example when the regulating error is large), the smaller is the angle of inclination in this curve portion.

It will be recognized that the voltage at the capacitors of the two trigger circuits A, B has a periodic wave shape. For example, during portion I of a cycle period, the voltage $A_c$ at capacitor 11 in trigger circuit A increases along the line $y$ at a constant rate up to a limit value $u$ at which a firing pulse occurs at the output terminal $a4$ and is supplied to the thyristor 1. Up to the end of time portion I, the capacitor voltage then remains constant at the value $u$ represented by the straight horizontal curve portion Z and determined by the Zener diode 21. This range Z, in which the capacitor 11 is being charged, constitutes the firing range. It is followed by the time portion II (measuring range) during which the capacitor 11 is discharged in accordance with the curve portion $x$. It will be further recognized that during charging of the capacitor 1 in time portion I, there always occurs a discharge of the capacitor 11' in trigger circuit B (measuring range). Consequently, one of the two trigger circuits is always operating in the firing control range, whereas the other is simultaneously operating in the measuring range.

Figure 7:
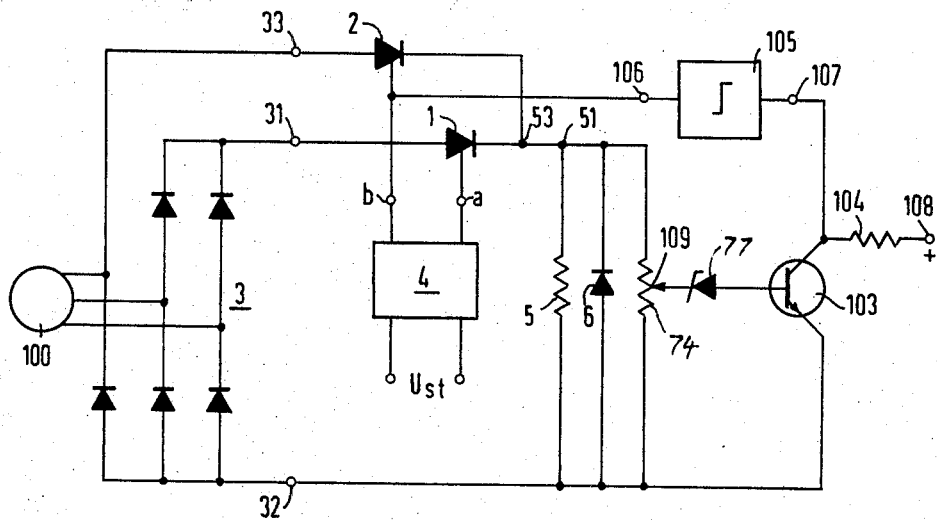
FIG. 7 shows schematically a circuit for providing a control voltage for firing control circuits as shown in FIGS. 3 and 6.

As will be seen from FIG. 7, the two trigger circuits A and B are controlled by a voltage which is derived from the actual load voltage with the aid of a resistor 74 and a Zener diode 77. A variable resistor 73 permits setting the system so that, when the regulating error remains below a given limit value, only the trigger circuit B will issue firing pulses. Under such conditions, the voltage at capacitor 11' in trigger circuit B may correspond to the curve $B_c$ shown in FIG. 5.

In this case, however, the trigger circuit A must not issue firing pulses. The voltage at capacitor 11 then has the time curve shown at $A'_c$ in FIG. 5 from which it will be seen that, within the control period, the voltage at capacitor 11 never reaches the value $u$ required for the transistor 1 to be turned on.

Only when the regulating error exceeds the above-mentioned limit value can the discharge of the capacitor take place so slowly that the voltage at capacitor 11 will reach the limit value $u$ near the end of the control portion I of the cycle period. As the regulating error further increases, the firing moment becomes further displaced toward the left. Under such conditions, the capacitor 11' can no longer be discharged so that the transistor 22' will remain turned on. This has the consequence that no firing pulse is issued during the second portion II of the cycle period.

The load current, however, can commutate from thyristor 1 to thyristor 2 only if a firing pulse is supplied to thyristor 2 shortly after the beginning of the time portion II. For this purpose, the voltage at the load 5 may be supervised with the aid of a Zener diode and the transistor may then be turned on as soon as this voltage declines below a given limit value. The transistor then releases a current surge which is supplied to the control path of the thyristor 2, if desired through a flip-flop stage. Such as supplemented control unit is applicable in cases where the wave shape of a voltage supplied from a generator departs from the sinusoidal shape, this being usually the case with synchronous generators which, when subjected to a load, furnish an output voltage of substantially rectangular wave shape.

The system shown in FIG. 7 corresponding in all other respects to the system shown in FIG. 3 and described above, embodies the just-mentioned features.

According to FIG. 7, the additional firing pulse for the thyristor 2 is produced by a monostable trigger stage 105 of conventional, preferably transistorized type which furnishes at its output 106 a pulse whenever the voltage at the input 107 exceeds a given positive value. Preferably the length of the pulse is adjusted to have its maximum correspond to one-third of time portion II. The point 107 of the trigger stage 105 is connected to the collector of an n-p-n transistor 103 and is also connected through a resistor 104 with a terminal 108 to which a positive potential is applied. The base electrode of the transistor 103 is connected through the above-mentioned Zener diode 77 with the adjustable tap 109 of the above-mentioned resistor 73 which forms a potentiometer parallel to the load 5. In this embodiment the load 5 is constituted by the control field winding of an alternator 100 from whose three-phase output busses R, S, T the rectifier assembly 3 is energized.

Assume for example that the voltage at the load 5 drops below a given value determined by the Zener diode 77 and the adjustment of the tap 109 on resistor 73. Then a current can no longer flow through the Zener diode 77 and hence through the transistor 103. Consequently the collector potential of the transistor rises and therefore also the potential at the input 107 of the trigger stage 105 up to the potential at the terminal 108. This releases a pulse at the output 106 of the trigger stage which is applied to the firing circuit for the thyristor 2.

Since the load 5 is constituted by the control field winding of the alternator 100, its excitation determines the alternating voltage of the output busses R, S, T. The system therefore is applicable for controlling or regulating the generator output voltage to maintain this voltage and consequently the rectified load voltage at an adjusted constant value. A system of this kind is also applicable if the curve shape of the generated voltage departs from the sine wave, which is the case with synchronous generators furnishing an approximately rectangular wave voltage when operating under load.

A system according to our invention, therefore is of particular importance for controlling and regulating the excitation current of alternators now finding increasing use in current distribution installations on vehicles instead of direct-current generators. For these particular applications, the invention not only affords the advantage of requiring a smaller number of simpler components but also secures a reliable operation if no sinusoidal voltages are available. The output voltage of a synchronous generator from which a direct current is obtained with the aid of an interposed rectifier, is sinusoidal only under no-load condition but becomes more and more rectangular in wave shape as the rectifier is subjected to loading. In a system according to the invention, such operating conditions have only the effect of prolonging the time portion II at the expense of the time portion I, a change readily taken care of by a suitable design of the firing control means.

To those skilled in the art, it will be obvious, upon a study of this disclosure, that our invention permits of various modifications and may be given embodiments other than particularly illustrated and described herein, without departing from the essential features of our invention and within the scope of the claims annexed hereto.

We claim:

1. System for controlling the means value of a load current by periodic switching, comprising load buses, a first direct-current source and a first thyristor through which said first source is connected to said load buses for applying a first source voltage thereto, a second direct-current source having a periodic voltage which is at least temporarily zero and thereafter lower than said first source voltage in a first portion of each switching period and is higher than said first source voltage in the remaining portion of said period, a second thyristor through which said second source is connected to said load buses for applying said periodic voltage thereto, and firing control means connected to said first and second thyristors for periodically firing them in sequence so as to energize said buses from said second source during said second portion of each period.

2. System for controlling the mean value of a load current by periodic switching, comprising a three-phase alternating-current supply, first rectifier means having an input connected to said supply and being free of reactive smoothing means so as to provide a first periodic direct voltage, second rectifier means having an input connected to said supply and being free of reactive smoothing means, said second rectifier means having a second periodic direct voltage which is at least temporarily zero and thereafter lower than said first voltage in a first portion of each switching period and is higher than said first voltage in the remaining portion of said period, two load buses, two thyristors through which said two rectifier means are connected to said load buses for applying thereto said two voltages, and firing control means connected to said two thyristors for periodically firing them in sequence so as to energize said buses from said second rectifier means during said second portion of each period.

3. In a current control system according to claim 2, said first rectifier means comprising a three-phase bridge network of diodes having only five bridge legs with respective diodes of which three are connected with one of said load buses and two with the other bus.

4. In a current control system according to claim 2, said first rectifier means comprising a three-phase bridge network of diodes having only five legs with respective diodes, three of said legs being connected with the negative one of said load buses and the other two legs with the positive bus.

5. In a current control system according to claim 2, said second rectifier means comprising two direct-voltage output terminals, two diodes connected between one of said terminals and respective two of the three phases of said alternating-current supply, said other terminal being in symmetrically conducting connection with the third phase of said supply.

6. In a current control system according to claim 2, said second rectifier means comprising two direct-voltage output terminals, of which one is positive and the other negative, two diodes connected between said negative terminal and respective two of the three phases of said alternating-current supply, said positive terminal being in symmetrically conducting connection with the third phase of said supply.

7. System for controlling the mean value of a load current by periodic switching, comprising two direct-current load buses, a three-phase alternating-current supply means, a three-phase rectifier bridge network having first and second output terminals and having only five legs with respective diodes, three of said legs connecting said first terminal with the respective three phases of said supply, the remaining two legs connecting said second terminal with only two of said three phases respectively, said rectifier network having a first periodic direct voltage between said first and second terminals, a first thyristor through which said load buses are connected to said first and second terminals to be energized therefrom, a third terminal in symmetrically conducting connection with the one supply phase other than those to which said remaining two legs are connected whereby a second periodic direct voltage is applied between said first and third terminals, a second thyristor through which said load buses are connected to said first and third terminals to be energized therefrom, and firing control means connected to said first and second thyristors for periodically firing them in sequence so as to energize said buses by said second direct voltage during said second portion of each period.

8. In a current control system according to claim 7, said first terminal being connected with one of said two load buses, said first thyristor being serially interposed between said second terminal and said other bus, and said second thyristor being serially interposed between said third terminal and said other bus.

9. In a current control system according to claim 2, said second thyristor being serially interposed between one of said load buses and said second rectifier means, and said second thyristor being connected in series with said first thyristor between said one load bus and said second rectifier means.

References Cited

UNITED STATES PATENTS 3,100,851 8/1963 Ross et al.
3,278,827 10/1966 Corey et al. _____ 321—44
3,289,071 11/1966 Rosenberry _____ 321—8

JOHN F. COUCH, *Primary Examiner.*

W. H. BEHA, *Assistant Examiner.*